(12) United States Patent
Alattar

(10) Patent No.: US 7,427,334 B2
(45) Date of Patent: Sep. 23, 2008

(54) METHOD AND APPARATUS FOR ENCODING SUBSTRATES WITH INFORMATION

(75) Inventor: Adnan M. Alattar, Tigard, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 11/419,718

(22) Filed: May 22, 2006

(65) Prior Publication Data

US 2007/0110296 A1    May 17, 2007

Related U.S. Application Data

(63) Continuation of application No. 10/642,451, filed on Aug. 14, 2003, now Pat. No. 7,050,201, which is a continuation of application No. 09/515,545, filed on Feb. 29, 2000, now Pat. No. 6,608,919, which is a continuation-in-part of application No. 09/437,357, filed on Nov. 10, 1999, now abandoned.

(51) Int. Cl.
*D21F 1/44* (2006.01)
*G06K 9/00* (2006.01)

(52) U.S. Cl. ............... 162/110; 162/116; 162/348; 162/357; 162/362; 382/108; 382/285

(58) Field of Classification Search ............... 162/110, 162/116, 117, 140, 208, 210, 358.2, 358.4, 162/362, 373, 378, 348, 357; 382/135, 191, 382/108, 278, 280, 100, 276, 285; 283/113
See application file for complete search history.

(56) References Cited

U.S. PATENT DOCUMENTS

| | | | |
|---|---|---|---|
| 4,234,214 A | 11/1980 | Lee | |
| 4,971,646 A | 11/1990 | Schell et al. | |
| 5,062,666 A | 11/1991 | Mowry et al. | |
| 5,291,243 A | 3/1994 | Heckman et al. | |
| 5,495,581 A | 2/1996 | Tsai | |
| 5,521,722 A | 5/1996 | Colvill et al. | |
| 5,583,950 A | 12/1996 | Prokoski | |
| 5,721,583 A | 2/1998 | Harada et al. | |
| 5,817,205 A | 10/1998 | Kaule | |
| 5,871,615 A * | 2/1999 | Harris | ............... 162/140 |
| 6,148,091 A | 11/2000 | DiMaria | |
| 6,166,750 A | 12/2000 | Negishi | |
| 6,709,333 B1 | 3/2004 | Bradford et al. | |
| 6,711,465 B2 | 3/2004 | Tomassi | |
| 6,748,533 B1 | 6/2004 | Wu et al. | |
| 6,926,203 B1 | 8/2005 | Sehr | |

(Continued)

OTHER PUBLICATIONS

Szepanski, W., "A Signal Theoretic Method for Creating Forgery-Proof Documents for Automatic Verfication", 1979 Carnahan Conference on Crime Countermeasures, May 16-18, 1997, pp. 101-109.

*Primary Examiner*—Eric Hug

(57) ABSTRACT

The present invention provides methods and apparatus to encode substrates (e.g., paper, synthetics, etc.) with information. In one implementation a method is provided including: receiving data that corresponds to a two-dimensional signal that encodes plural bits of data; receiving data that corresponds to a frequency-domain signal, the data corresponding to a representation in a spatial domain through inverse transforming the frequency-domain signal; and defining characteristics for an element of a substrate-making process, the characteristics including at least a pattern representing the spatial domain representation and the two-dimensional signal.

20 Claims, 1 Drawing Sheet

U.S. PATENT DOCUMENTS 6,999,936 B2 2/2006 Sehr
7,024,563 B2 4/2006 Shimosato et al.
7,167,844 B1 1/2007 Leong et al.

* cited by examiner

US 7,427,334 B2

METHOD AND APPARATUS FOR ENCODING SUBSTRATES WITH INFORMATION

RELATED APPLICATION DATA

This application is a continuation of U.S. patent application Ser. No. 10/642,451, filed Aug. 14, 2003 (issuing as U.S. Pat. No. 7,050,201). The Ser. No. 10/642,451 application is a continuation of U.S. patent application Ser. No. 09/515,545, filed Feb. 29, 2000 (now U.S. Pat. No. 6,608,919), which is a continuation-in-part of application Ser. No. 09/437,357 (now abandoned), filed Nov. 10, 1999.

FIELD OF THE INVENTION

The present invention relates to paper-making, and more particularly relates to techniques useful in encoding information in paper during its formation.

BACKGROUND AND SUMMARY OF THE INVENTION

Digital watermarking is a burgeoning science with an extensive literature. Some of it, by the present assignee, relates to texturing the surface of a paper to convey optically-detectable digital information.

The assignee's U.S. Pat. No. 5,850,481, for example, details how the microtopology of a paper can be shaped, e.g., by a Braille-like machine, to encode digital data. The assignee's application Ser. No. 09/127,502 (now U.S. Pat. No. 6,345,104) details how the high-pressures used in intaglio printing can be used to similar effect.

In accordance with a preferred embodiment of the invention, paper is textured during the paper-making process, rather than in a subsequent process, thereby affording various advantages. The texture yields a known signature when transformed to the frequency domain. This signature can be used for various purposes, including determining the angular orientation of the paper when scanned and analyzed for the presence of watermark data, and for simple document recognition purposes (e.g., photocopiers that refuse to reproduce banknotes). One way of effecting the desired texturing is by shaping the surface of a de-watering element accordingly.

The foregoing and additional features of the present invention will be more readily apparent from the following detailed description, which proceeds with reference to the accompanying drawings.

DETAILED DESCRIPTION OF THE DRAWINGS

Figure 1:
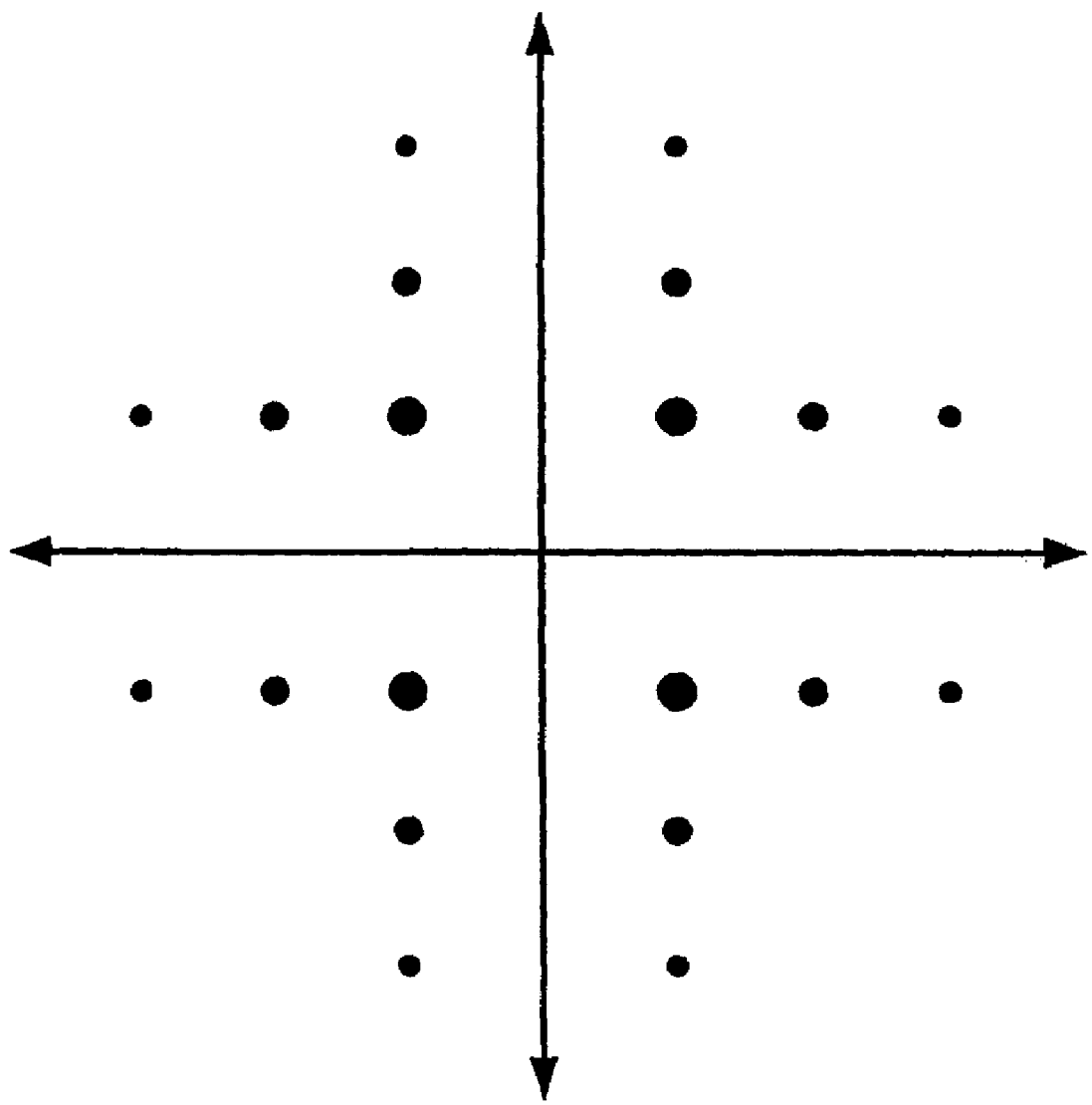
FIG. 1 shows the frequency spectrum attributed to surface texture of a banknote paper.

On optical scanning of an existing banknote, it was found that that the image data had components that were not attributable to the artwork printed on the note. Rather, further examination found that texturing left during the paper-making process had a pattern that appeared—when transformed into the frequency domain by a FFT process—as a well defined array of spectral impulses (FIG. 1). This spectrum of this particular note had the appearance of a 2-dimensional sampled sync function. (The size of the points in FIG. 1 signifies amplitude of the corresponding frequency component; each is an impulse.)

In the digital watermarking field, subliminal frequency domain patterns are sometimes deliberately inserted into images to serve as calibration signals by which scale, rotation, and offset can be computer-determined. (See, e.g., the assignee's U.S. Pat. No. 5,862,260.) Instead of adding such a pattern during printing, the patterns formed during paper-making might alternatively be used.

In accordance with one embodiment of the present invention, the printing on a paper is oriented so as to align in a predetermined manner with the texture markings on the paper surface. For example, the printing process can be tightly integrated with the paper-making process so that the orientation of the printing applied to the paper coincides in the desired manner with the paper texture. In a related embodiment, the paper-making and printing processes are not tightly integrated, but the paper is formed or cut so that its edges correspond in a known relationship to the texture pattern on the paper surface. By such arrangement, careful alignment of the paper's edge with a reference during later printing can assure that the image is oriented in the desired manner with the substrate texture. In still another embodiment, the paper is scanned just before printing, and the resulting data is processed so as to determine orientation of the texture signal. Printing is then oriented relative to the paper in the desired manner.

When a document printed by such a technique is thereafter placed on the platen of a scanner and scanned, the resulting image data is of uncertain rotation. The scan data can be converted to a frequency domain (e.g., by the FFT), and the known frequency pattern due to the paper texture can then be used as a calibration signal permitting the rotational state of the image data to be determined. Decoding of the watermark can then proceed once the rotation is known. (In some watermarking systems, scale and/or offset may also need to be determined. However, their determination is facilitated by knowledge of rotation. Moreover, the frequency domain signal may result in some ambiguity in the document orientation, e.g., rotations beyond 180 degrees may appear as rotations in the range 0-180 degrees. Such cases can be resolved through other means.)

As is familiar to those skilled in the art, paper is typically formed by depositing a layer of pulp slurry on a planar or cylindrical surface, extracting the water from the pulp, and drying. The middle step, sometimes known as de-watering, can be performed using various structures. Porous ceramic rollers are used in some processes, with a vacuum applied to the inside of the roller that serves to draw water away from the wet layer, through the pores, and to the inside of the roller. Other processes involve meshes or screens through which water is drawn from the pulp. The surfaces of such de-watering structures can be textured to impart a complementary texture (and a corresponding frequency-domain signal) to the paper.

In particular, a desired frequency domain signal can first be defined. The signal can be comprised of one or more impulses in the frequency domain, or can be spread across the spectrum. (The signal shown in FIG. 29A of U.S. Pat. No. 5,862,260 is exemplary of a suitable signal.) This signal is then inverse-transformed into the spatial domain, and the de-watering element then shaped in accordance with the resulting pattern.

In many embodiments, the frequency domain signal is manifested as a fine continuous "weave"-like pattern in the spatial domain. In other embodiments, pseudo-random patterns can be used. If desired, certain discrete markings in the spatial domain can also be provided on the de-watering element surface to provide additional functionality in the texture signal (e.g., permitting image translation to be determined in addition to image rotation).

In other embodiments, the frequency domain signal effected by the texturing does not serve as a calibration adjunct to another signal (e.g., a watermark signal). Rather, the frequency domain signal is employed alone. One application is in simple document recognition. For example, a photocopier may be arranged to look for the frequency domain signature characteristic of the texturing associated with banknote paper and, if detected on a document-to-be-copied, refuse to copy. (An example of another banknote sensing photocopier, albeit one that looks for a pattern in the printing on the document rather than in the paper texture, is shown in Canon's U.S. Pat. No. 5,583,614.) The texturing may be arbitrarily complex so as to reduce false triggering of such a detector.

In still other embodiments, the texturing can convey a plural-bit watermark payload. For example, the presence or absence of different frequency-domain components can signal "1" or "0" bits. Many other such arrangements will be apparent.

To provide a comprehensive disclosure without unduly lengthening this specification, applicant incorporates by reference the patents and applications cited above.

Having described an illustrated the principles of my invention with reference to specific embodiments, it will be recognized that the principles thereof can be implemented in many other, different, forms. For example, while the detailed embodiment discussed use of the FFT transform, the patterns formed during paper-making can likewise be discerned in other transform domains. Similarly, while a de-watering element was particularly noted as suitable for texturing, other elements in a paper-making apparatus can be alternatively be textured with similar effect. Still further, while the invention was illustrated with reference to conventional "paper," the principles thereof are equally applicable to other printable media, including plastic and the material marketed by DuPont under the brand name Tyvek. Yet further, while the illustrated embodiment textured the paper during its formation, post-formation texturing—as detailed in the assignee's other patents/applications—can be used in the particular applications above-detailed (e.g., to determine image rotation, for simple document recognition, etc.).

Moreover, the particular combinations of elements and features in the above-detailed embodiments are exemplary only; the interchanging and substitution of these teachings with other teachings in this and the incorporated-by-reference patents/applications are also contemplated.

I claim:

1. A paper-making method including:
   defining a two-dimensional signal that encodes plural bits of data;
   defining a frequency-domain signal;
   inverse transforming the frequency-domain signal to yield a pattern in the spatial domain; and
   shaping an element utilized in the paper-making method in accordance with the spatial domain pattern; and
   shaping the element of the paper-making method in accordance with a pattern corresponding to the signal that encodes plural bits of data.

2. The method of claim 1 in which the element is a de-watering element.

3. The method of claim 1 in which the two-dimensional signal defines the pattern in the spatial domain.

4. The method of claim 3 further comprising combining the spatial domain pattern and the signal.

5. The method of claim 1, wherein said acts of shaping impart a subliminal pattern on the element.

6. A de-watering element for a paper-making apparatus, characterized in that its surface topology is patterned in accordance with the following method:
   defining a two-dimensional signal that encodes plural bits of data;
   defining a frequency-domain signal;
   inverse transforming the frequency-domain signal to yield a pattern in the spatial domain; and
   shaping an element of the paper-making apparatus in accordance with the spatial domain pattern; and
   shaping the element of the paper-making apparatus in accordance with a pattern corresponding to the signal that encodes plural bits of data.

7. The element of claim 6 in which the frequency-domain signal comprises plural impulses.

8. The element of claim 6 in which the two-dimensional signal defines the pattern in the spatial domain.

9. The element of claim 6, wherein the shaping of the element imparts a subliminal pattern on the element.

10. A method comprising:
    receiving data that corresponds to a two-dimensional signal that encodes plural bits of data;
    receiving data that corresponds to a frequency-domain signal, the data corresponding to a representation in a spatial domain through inverse transforming the frequency-domain signal; and
    defining characteristics for an element of a substrate-making process, the characteristics including at least a pattern representing the spatial domain representation and the two-dimensional signal.

11. The method of claim 10 in which the element is a de-watering element.

12. The method of claim 10 in which the two-dimensional signal defines the representation pattern in the spatial domain.

13. The method of claim 12 further comprising combining the spatial domain representation and the signal.

14. The method of claim 10, further comprising providing a subliminal pattern on the element.

15. The method of claim 10 further comprising imparting the pattern to a substrate.

16. A substrate imparted with a pattern according to the method of claim 15.

17. A computer-readable medium comprising instructions thereon, the instructions comprising instructions to perform the method of claim 15.

18. The method of claim 10 wherein the substrate comprises at least one substrate from a group of substrates comprising paper or synthetics.

19. A computer or computer hardware programmed to:
    receive data that corresponds to a two-dimensional signal that encodes plural bits of data;
    receive data that corresponds to a frequency-domain signal, the data corresponding to a representation in a spatial domain through inverse transforming the frequency-domain signal; and
    define characteristics for an element of a substrate-making process, the characteristics including at least a pattern representing the spatial domain representation and the two-dimensional signal.

20. A method comprising:
    obtaining first information corresponding to a two-dimensional signal associated with plural bits of data;
    obtaining second information corresponding to a frequency-domain signal, the second information corresponding to a representation in a spatial domain through inverse transforming the frequency-domain signal; and specifying characteristics for a component of a substrate-making process, the characteristics including at least a pattern representing the spatial domain representation and the two-dimensional signal.

* * * * *